US 9,354,092 B2

(12) United States Patent
Shyy et al.

(10) Patent No.: US 9,354,092 B2
(45) Date of Patent: May 31, 2016

(54) IN-LINE PRESSURE-BASED FLOW METER

(71) Applicant: Flometrix, Ames, IA (US)

(72) Inventors: Yuh-Yuan Shyy, Ames, IA (US); Manjit Misra, Ames, IA (US)

(73) Assignee: Flometrix, Ames, IA (US)

( * ) Notice: Subject to any disclaimer, the term of this patent is extended or adjusted under 35 U.S.C. 154(b) by 211 days.

(21) Appl. No.: 13/829,022

(22) Filed: Mar. 14, 2013

(65) Prior Publication Data
US 2013/0340536 A1  Dec. 26, 2013

Related U.S. Application Data

(60) Provisional application No. 61/662,692, filed on Jun. 21, 2012.

(51) Int. Cl.
| | |
|---|---|
| *G01G 11/04* | (2006.01) |
| *G01G 11/16* | (2006.01) |
| *G01F 1/28* | (2006.01) |
| *G01F 1/34* | (2006.01) |

(52) U.S. Cl.
CPC .. *G01F 1/34* (2013.01); *G01F 1/28* (2013.01); *G01G 11/04* (2013.01); *G01G 11/16* (2013.01)

(58) Field of Classification Search
CPC ............ G01F 1/206; G01F 1/30; G01F 1/76; G01F 1/28; G01F 1/34; G01G 11/00; G01G 11/04; G01G 11/043; G01G 11/16
See application file for complete search history.

(56) References Cited

U.S. PATENT DOCUMENTS

| | | | | |
|---|---|---|---|---|
| 2,652,141 A | * | 9/1953 | Gilmore | 177/103 |
| 2,941,401 A | | 6/1960 | Streeter | |
| 3,056,293 A | * | 10/1962 | Ofner | 73/198 |
| 3,167,953 A | * | 2/1965 | Dillon | 73/862.636 |
| 3,212,330 A | * | 10/1965 | De Pollier | 73/861.73 |
| 3,232,486 A | * | 2/1966 | Ofner | 222/55 |
| 3,523,451 A | | 8/1970 | Kohn | |
| 3,640,136 A | * | 2/1972 | Nolte | 73/861.73 |
| 3,878,103 A | | 4/1975 | Miller et al. | |

(Continued)

FOREIGN PATENT DOCUMENTS

GB  2019914 A * 11/1979 ........... G01G 11/043

OTHER PUBLICATIONS

"FeedPro: A step up to better pork production through improved feed blending", Agtronix, Publisher: Pella Electronics Co. Inc., Pella, IA.

*Primary Examiner* — Randy W Gibson
(74) *Attorney, Agent, or Firm* — Davis, Brown, Koehn, Shors & Roberts, P.C.

(57) ABSTRACT

The Application discloses an in-line, high capacity apparatus and method for measuring a flowable component, such as seed, grain or other material. The apparatus and method generally function by measuring the pressure applied to a rounded cap by the flowing material. In certain embodiments, the apparatus and method comprise a housing containing a sensing unit, with the housing further comprising a rounded cap in mechanical communication with a load cell. In certain exemplary embodiments, the apparatus and method also comprise a processor, wherein the sensing unit is in communication with the processor so as to measure the flow rate of material passed through the housing by measuring the pressure of the material on the rounded cap. In certain embodiments, the apparatus and method allow the user to regulate the flow rate.

11 Claims, 7 Drawing Sheets

(56) References Cited

U.S. PATENT DOCUMENTS

| | | | |
|---|---|---|---|
| 3,939,709 A * | 2/1976 | Echtler | 73/861.73 |
| 3,945,532 A | 3/1976 | Marks | |
| 4,067,238 A | 1/1978 | Oetiker | |
| 4,157,661 A | 6/1979 | Schindel | |
| 4,254,664 A | 3/1981 | Graham | |
| 4,397,423 A | 8/1983 | Beaver et al. | |
| 4,440,029 A | 4/1984 | Tomiyasu et al. | |
| 4,637,262 A | 1/1987 | Vesa | |
| 4,765,190 A | 8/1988 | Strubbe | |
| 4,788,930 A | 12/1988 | Matteau et al. | |
| 5,118,410 A | 6/1992 | Rumberger | |
| 5,335,554 A | 8/1994 | Kempf et al. | |
| 5,343,761 A * | 9/1994 | Myers | 73/861.73 |
| 5,423,456 A | 6/1995 | Arendonk et al. | |
| 5,561,250 A | 10/1996 | Myers | |
| 5,895,865 A | 4/1999 | Ozawa | |
| 6,073,667 A * | 6/2000 | Graffin | 141/372 |
| 6,339,901 B1 * | 1/2002 | Weder | 47/72 |
| 6,805,014 B1 | 10/2004 | Shyy et al. | |
| 6,814,108 B1 * | 11/2004 | Brandt, Jr. | 141/83 |
| 6,973,843 B2 | 12/2005 | Shyy et al. | |
| 7,323,644 B2 * | 1/2008 | Hanaoka et al. | 177/60 |
| 8,015,884 B1 * | 9/2011 | Carr et al. | 73/861.73 |

* cited by examiner

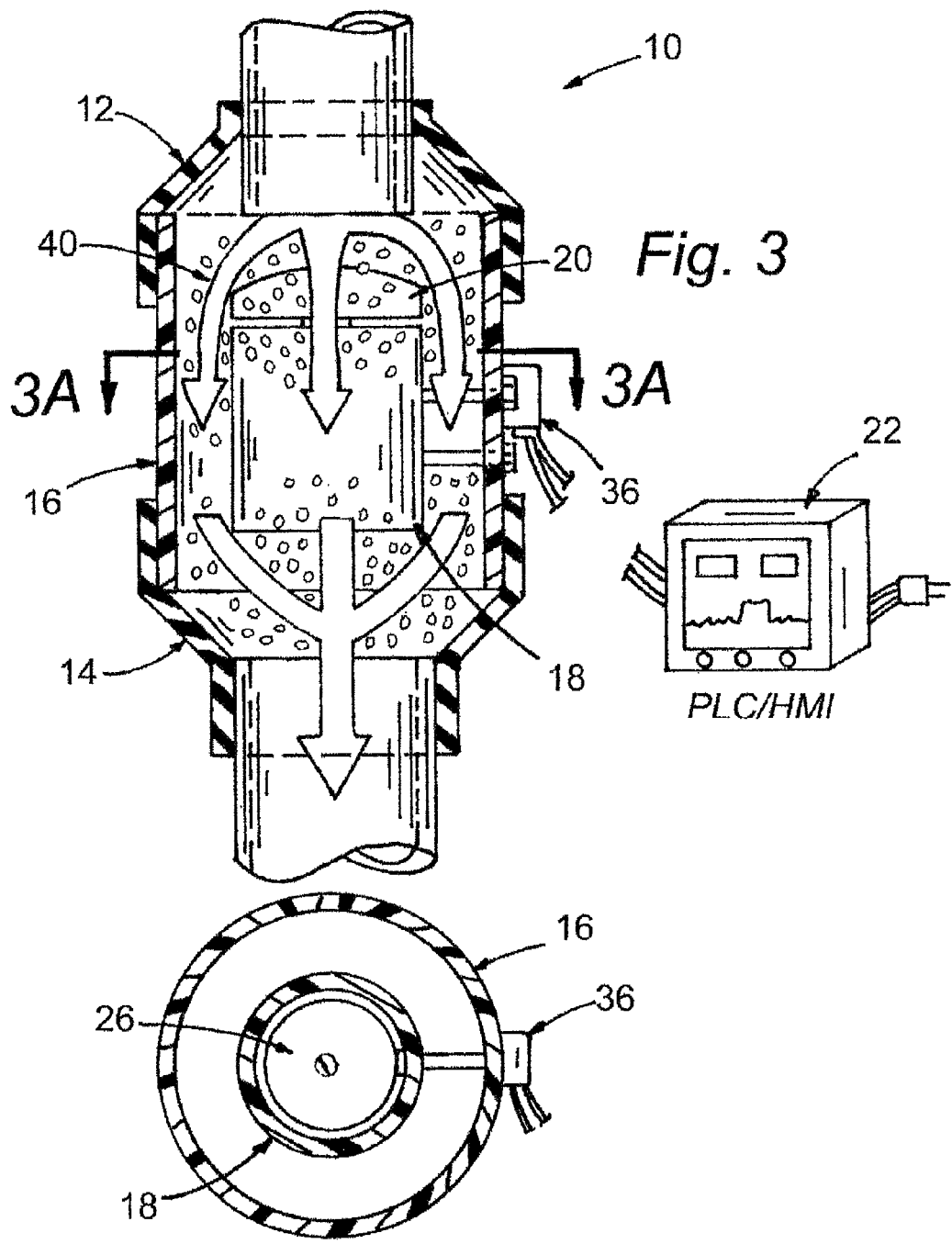

IN-LINE PRESSURE-BASED FLOW METER

CROSS-REFERENCE TO RELATED APPLICATION(S)

This application claims the benefit under 35 U.S.C. §119(e) to U.S. Provisional Patent Application 61/662,692, filed Jun. 21, 2012, entitled "In-Line Pressured-Based Flow Meter."

TECHNICAL FIELD OF THE INVENTION

The embodiments disclosed herein relate to various agricultural and industrial device components and related components, including pressure sensing devices, flow meters, and other related components. More specifically, this invention relates to an apparatus and method for monitoring the rate of flow and measuring the total weight of material that is passing through the flow meter under continuous flow conditions by way of pressure on a sensing cap rather than impact or any other prior art methods. Further embodiments relate to systems and methods for operating the above components.

BACKGROUND OF THE INVENTION

Monitoring and managing material flow through a passageway at different checkpoints in the passageway in real time for conditioning of grains or seeds, for example, can increase operating efficiency and can improve profitability.

Accurate flow measurement can result in improved process management and significant cost saving for companies handling high value products such as seeds and food grade materials, grain and feed handling, corn and soybean processing, popcorn, dry food ingredients, plastic pellets, and pharmaceuticals. Continuous monitoring of flow rates can also provide useful information for equipment adjustment or integrating with a process such as adding a chemical in seed treating or ingredients during food processing.

Current technologies generally require the impact of the seed or other flowable matter on the sensing device. There is a need in the art for an apparatus and method that achieves this result without measuring impact.

Exemplary embodiments of the flow meter measures the flow by way of pressure on a sensing cap, which can also be a displacement rather than impact. These embodiments of the flow meter allow the flow measurement of the material with less damage than that observed in the prior art, wherein the flow is obstructed by the impact on a surface or an impingement ring.

It is thus an object of the present invention to provide a method of measuring the weight of a flowable material based on gravity or some other pressure or force. It is a further object of the present invention to provide an apparatus for measuring the flow of such material.

These and other objects will be apparent to those skilled in the art.

BRIEF SUMMARY OF THE INVENTION

As discussed herein, the present invention relates to a method and apparatus for determining the weight of flowable material in unit time and the total weight during a time period of a material, particulate, slurry or liquid during conveyance with a sensing unit placed in the path of conveyance.

DESCRIPTION OF THE DRAWINGS

FIG. 3 is a cartoon schematic of another exemplary embodiment of the flow meter in operation.

FIG. 3A is a cross-sectional view of the housing and connector according to the embodiment in FIG. 3.

DETAILED DESCRIPTION

The present relates to a method for determining the rate of flow of a material, particulate, slurry or liquid during conveyance with a sensing unit placed in the path of conveyance such that the flow is measured without a loss in capacity of the conveyance. Exemplary embodiments of the present invention typically contain a flow sensing unit, an integrator and software directed to the interpretation of the data received by the sensing unit and integrator.

FIGS. 1A-5A generally show several example embodiments of the flow meter. It is understood that the various embodiments of flow meter disclosed herein can be incorporated into or used with any other known devices, systems and methods, including, but not limited to, the other flow meters and devices as defined herein.

Figure 1A:
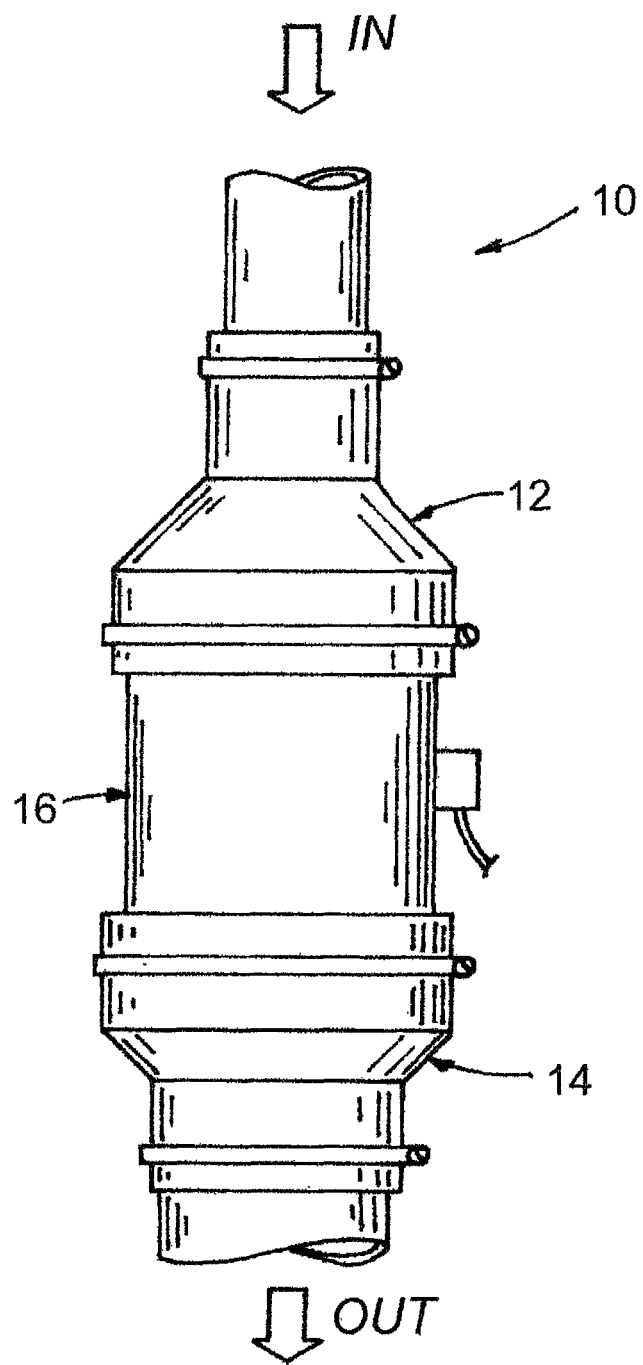
FIG. 1A is a schematic view of the exterior of an exemplary embodiment of the flow meter.
Figure 1B:
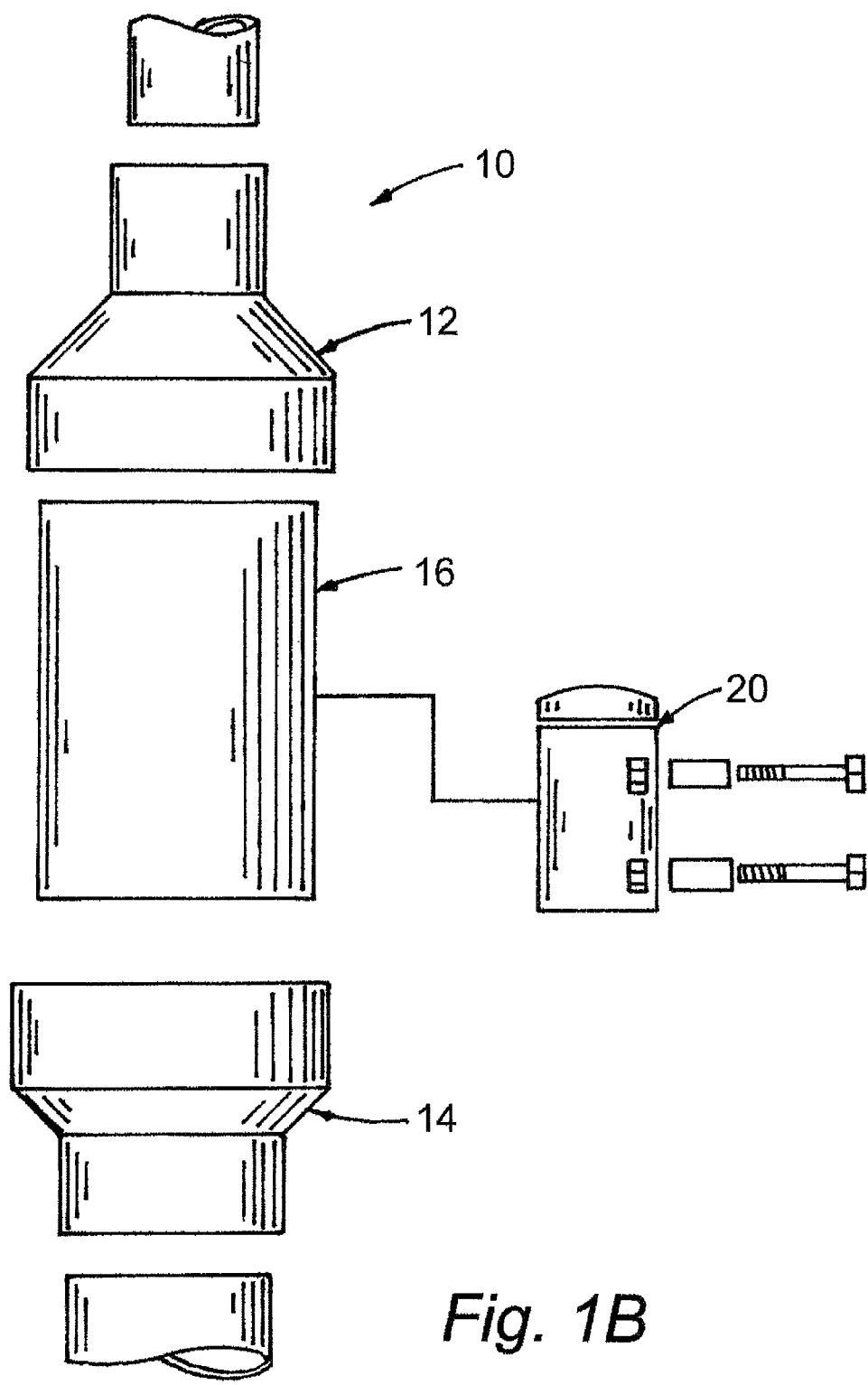
FIG. 1B is an exploded view of the exterior of an exemplary embodiment of the flow meter.
Figure 1C:
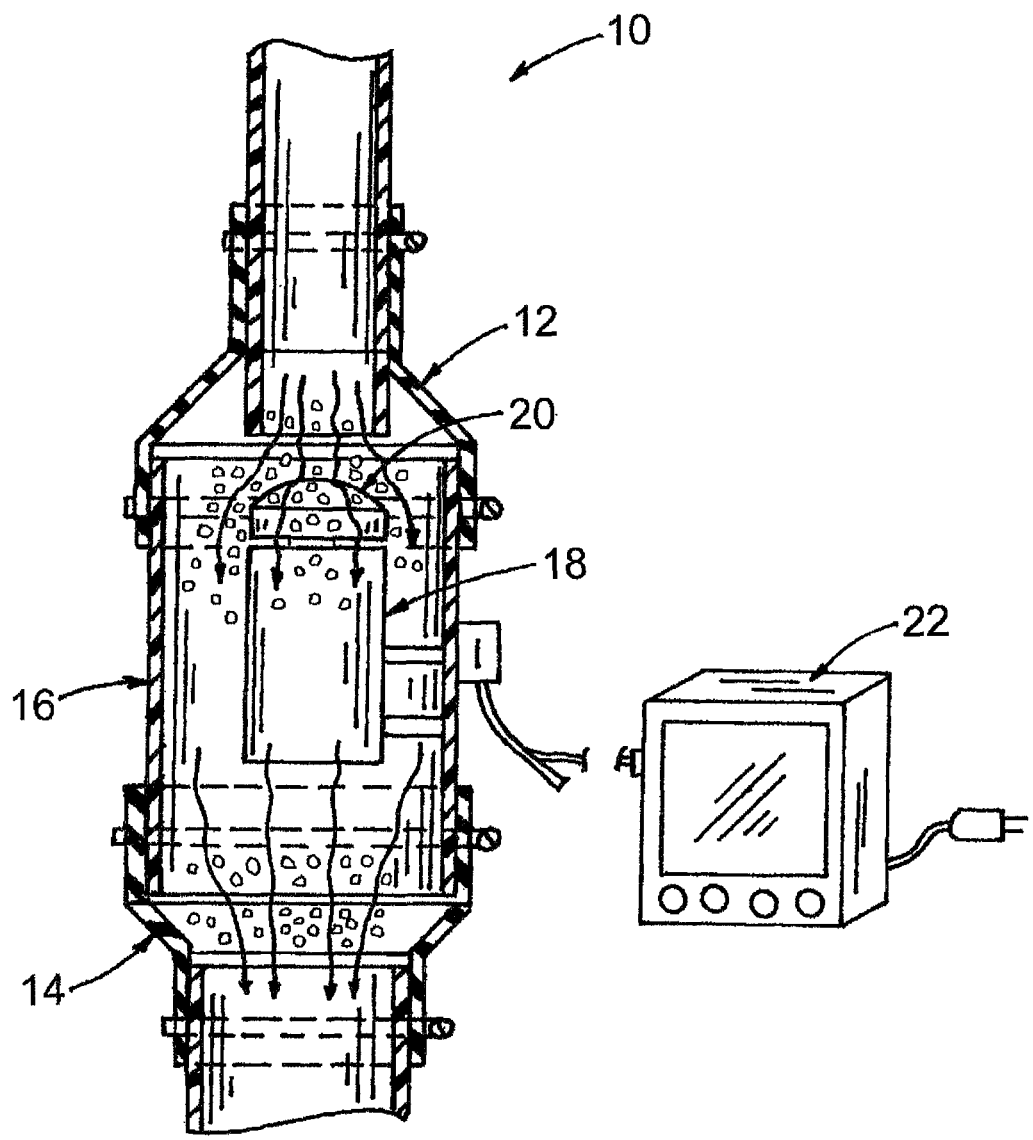
FIG. 1C is a cutaway view of an exemplary embodiment of the flow meter.

As depicted in FIGS. 1A-1B, in certain embodiments the flow meter 10 consists of corresponding top 12 and bottom 14 beveled outer regions and an outer tube 16, along with an inner unit 18 topped by a sensing cap 20. As best shown in FIG. 1C, the inner unit 18 is then suspended within the outer tube 16. In certain embodiments, the inner unit 18 is topped by the sensing cap 20, and is operationally and communicatively connected to the PLC, HMI or other processing unit 22. These embodiments allow for high capacity throughput, as there is enough space between the inner and outer unit to maintain the capacity. Further, in certain embodiments, the flow meter allows for a reduction in the overall slowing effect caused by the impact of the flowable material on a measuring apparatus. This is achieved by measuring the overall displacement of the rounded cap relative to the inlet space, rather than measuring the impact as was done in the prior art. This is because the material in the present invention flows through a smaller inlet space above the cap, thereby merely changing the direction of the flow slightly, rather than causing impact. The rate of flow can thereby be measured by, in typical embodiments, measuring the pressure, or weight of the flowable material on the cap. Exemplary embodiments are thus able to measure both the weight of flowable material in unit time and the total throughput that has passed over the cap and through the flow meter.

Other advantages of the flow meter over the prior art include the uniformity of the flow and the ability to regulate flow (as shown in part in FIGS. 5-5A), particularly when the flowable material is being introduced to the system by way of a bucket elevator, or other means which introduces spikes or other variations in the typical flow speed.

Figure 2A:
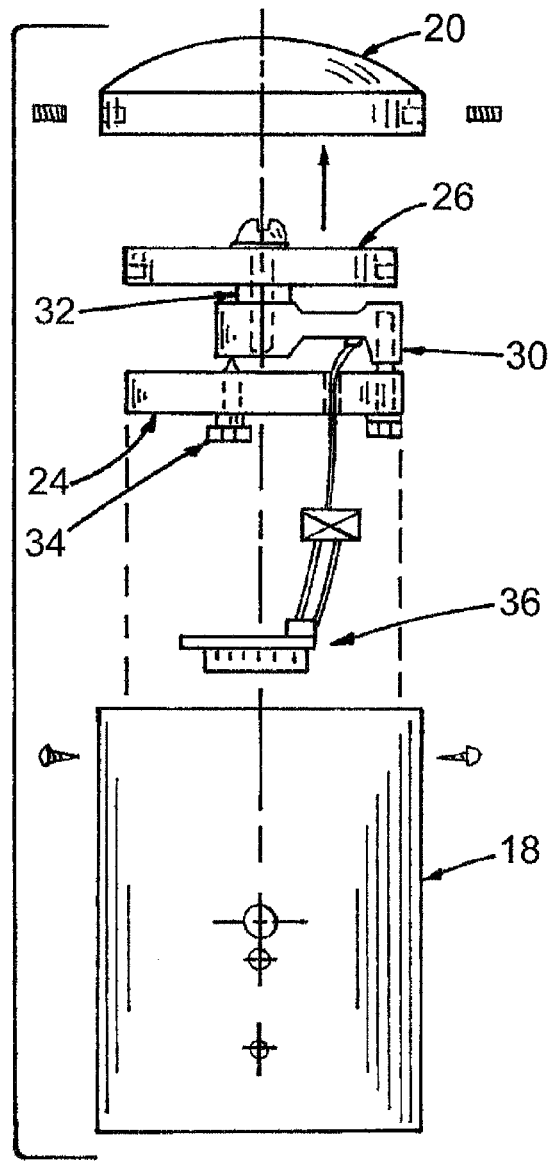
FIG. 2A is an exploded view of another aspect of certain implementations of the flow meter and associated devices, systems and methods.
Figure 2B:
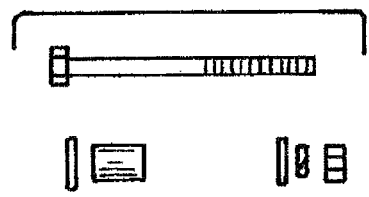
FIG. 2B is an exploded view of another aspect of an exemplary embodiment of the flow meter.
Figure 2C:
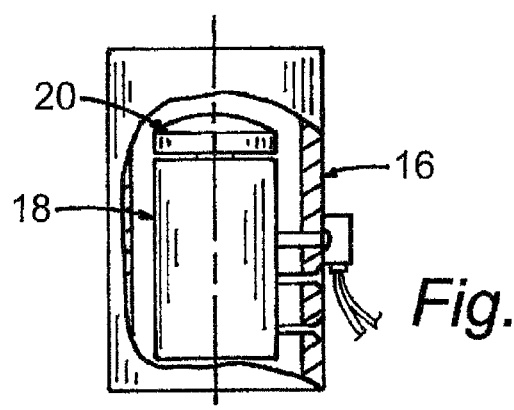
FIG. 2C is an exploded view of another aspect of an exemplary embodiment of the flow meter.

As best shown in FIGS. 2A-2C, in some embodiments the inner unit 18 consists of a sensing unit 19, comprising a cap 20 connected to a top plate 26, which is operationally integrated with a bottom plate 28, load cell 30 and spacer 32 so as to move the top plate 26 relative to the fixed or relatively stationary bottom plate 28, thereby applying pressure to the load cell 30. In some exemplary embodiments, a spacer 32 separates the top plate 26, bottom plate 28 and/or load cell 30. In some embodiments, a stopper 34 can be utilized to provide overload protection. FIG. 2B depicts a nut and bolt assembly 39 which can be used in certain embodiments to suspend the inner unit 18 and cap 20 within the housing 16, as is depicted in FIG. 2C. Other embodiments are possible.

FIGS. 3-3A illustrate an example of exemplary embodiments of the flow meter in operation. In operation, a material 40 is being passed through the flow meter 10 by way of gravity or some other force. While gravity is used in this particular embodiment, other forces or pressures can also be used to pass the material over the cap 20. The material 40 is passed over the inner unit 18, particularly the flow cap 20, so as to depress the flow cap 20 relative to the bottom plate (not shown) and thereby translate the pressure into a readable signal by way of the load cell, for transmittal to the processing unit. The rounded cap 20 allows the flowable material to pass over it in layers, rather than by impact, such that, for example, a top, middle, and lower layer can be formed, with the top layer moving most quickly and the lower layer moving most slowly. For example, if the material is corn, certain implementations of the flow meter allow for layers of corn to be passing over the cap simultaneously, so as to provide a cushion and reduce the overall impact damage, such as seed splitting or breaking. Because of this layering, the flow meter can measure product-to-product contact, rather than only product-to-surface contact. This presents an improvement in the art over the prior methods involving getting rid of the seed or other material by impact and impingement. FIG. 3A shows a cross-section of a certain embodiment of exemplary embodiments from a top view, thereby illustrating the means by which the inner unit 18 is connected to the outer tube 16 by way of a connection 36. As one of skill in the art would readily recognize, many possible structures could serve as a connection.

Thus, the material entering the flow meter 10 flows over a sensing cap 20 so as to apply pressure on the cap corresponding to the weight of the material is measured with a load cell 30 arrangement underneath the sensing cap 20 for real-time analysis of the weight. The vertical gap between the inlet and sensing cap is such so that the layers of the material on the sensing cap keep moving downward freely by gravity, and reduces the material impacting the sensing surface, as is seen in the prior art. The electronic signal from the load cell arrangement is further amplified, processed, and converted to the desired unit of measure.

Figure 4:
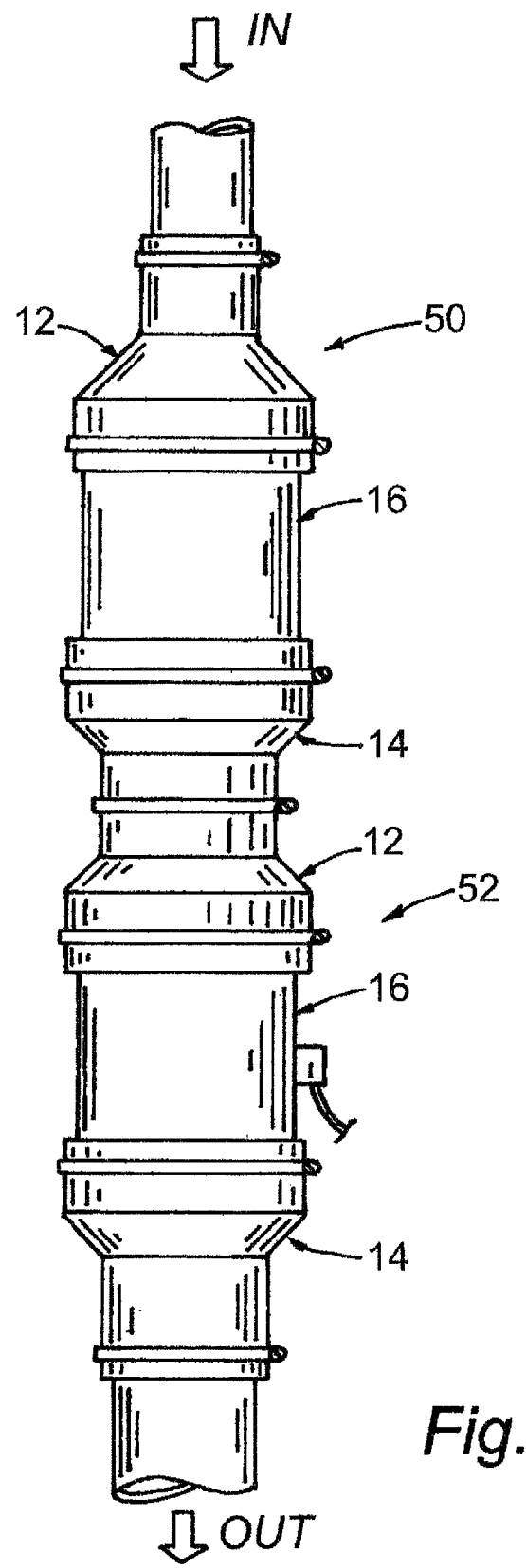
FIG. 4 is an exterior view of another exemplary embodiment of the flow meter.

As best shown in FIG. 4, in certain embodiments, a plurality of flow meters may be set in sequence. In these embodiments, for example, a first flow meter 50 can be provided without the load cell and sensor, so as to be used, for example, as a flow regulator prior to the flowable material entering a second flow meter 52. Again, in this example, each flow meter 50, 52 consists of corresponding top 12 and bottom 14 beveled outer regions and an outer tube 16.

Figure 5:
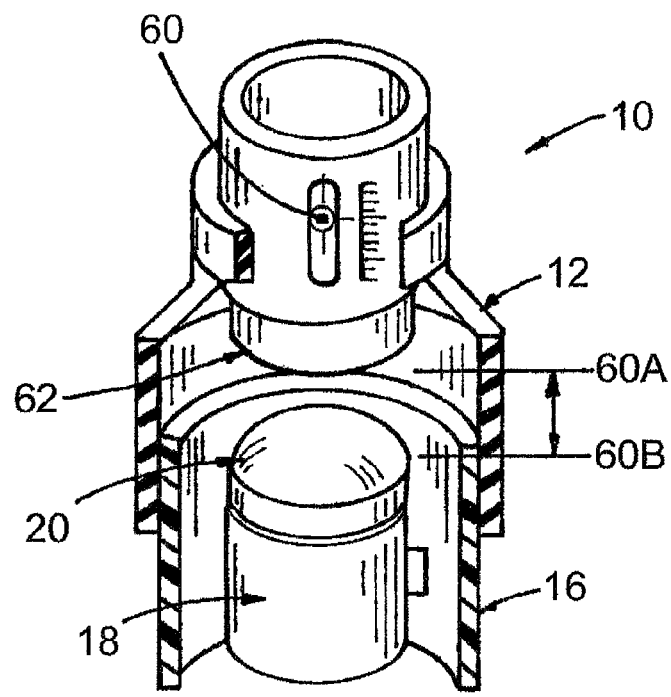
FIG. 5 is a cutaway perspective view of another embodiment of the flow meter and associated devices, systems and methods.
Figure 5A:
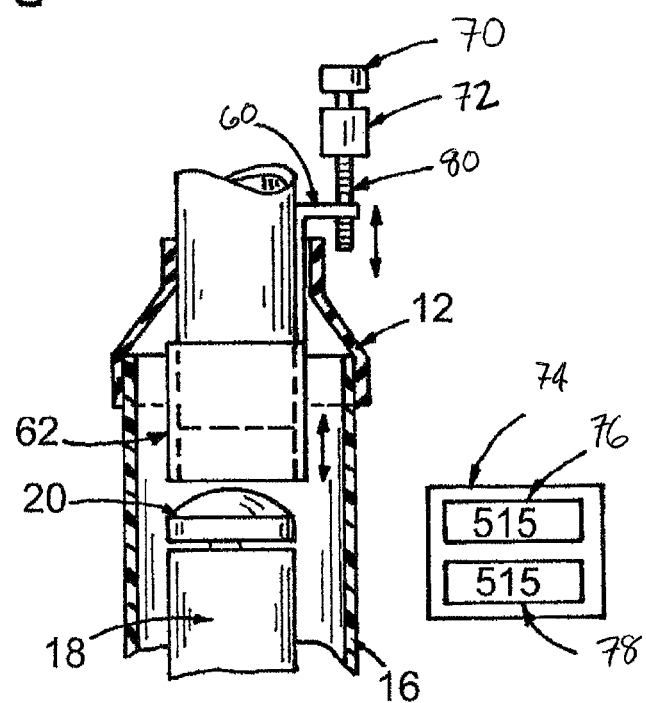
FIG. 5A is a sideview perspective according to the exemplary embodiment of FIG. 5.

FIG. 5 shows another exemplary embodiment of flow meter, wherein the flow meter 10 consists of corresponding top 12 and bottom 14 beveled outer regions and an outer tube 16, along with an inner unit 18 topped by a sensing cap 20. In this embodiment, the flow meter 10 also comprises an adjustment mechanism 60 which allows the adjustment of the overall distance 60A, 60B between the cap 20 and the flowable material inlet 62. In certain embodiments, the adjustment mechanism 60 allows the flow meter to be customized—either manually or based on feedback from the PLC, HMI or other processing unit (not shown)—so as to adjust the flow rate and handling of the flowable material, to improve sensitivity, reduce noise, improve efficiency, and the like. As shown in FIG. 5A, certain embodiments of the flow meter can also include a decoder 70 and stepping motor 72, operationally coupled to the adjustment mechanism 60 by way of a screw or other adjustment means 80, so as to regulate the overall distance 60A, 60B. Further, a flow readout 74 can be provided in certain embodiments, including, for example, the actual flow 76 and set flowrate 78.

Exemplary embodiments also provide other advantages, such as being dust-free, quieter in operation, lighter, durable, causing less impact damage to the flow-through material, and fully backwards compatible or otherwise retrofittable with existing systems.

While multiple embodiments are disclosed, still other embodiments of exemplary embodiments will become apparent to those skilled in the art from the following detailed description, which shows and describes illustrative embodiments of the invention. As will be realized, the invention is capable of modifications in various obvious aspects, all without departing from the spirit and scope of exemplary embodiments. Accordingly, the drawings and detailed description are to be regarded as illustrative in nature and not restrictive.

Although exemplary embodiments has been described with reference to preferred embodiments, persons skilled in the art will recognize that changes may be made in form and detail without departing from the spirit and scope of the invention.

We claim:

1. An apparatus for measuring the flow rate of a flowable material, comprising:
   a. a housing, further comprising:
      i. an inlet for receiving material; and
      ii. an outlet for exiting material;
   b. a sensing unit disposed within the housing and further comprising:
      i. a rounded cap;
      ii. a load cell;
      iii. a top plate; and
      iv. a bottom plate; and
   c. a processor;
   d. a vertical gap defined between the inlet and rounded cap and comprising an overall distance; and
   e. an adjustment mechanism;
      wherein the adjustment mechanism is configured to adjust the overall distance of the vertical gap defined between the rounded cap and the inlet to adjust the flow rate and allow for creation of layers of material over the rounded cap such that only a portion of the flowable material directly contacts the rounded cap without restricting material flow;
      wherein the top plate and bottom plate are operationally integrated with the load cell and configured to allow for the measurement of the pressure applied to the rounded cap by way of displacement of the rounded cap relative to the bottom plate; and
      further wherein the sensing unit is in electronic communication with the processor so as to measure the flow of material passed through the housing by measuring pressure of the material on the rounded cap by way of displacement of the rounded cap.

2. The apparatus of claim 1, wherein the sensing unit further comprises a movable top plate and a stationary bottom plate, such that the top plate moves relative to the bottom plate, thereby applying pressure to the load cell.

3. The apparatus of claim 2, further comprising a spacer.

4. The apparatus of claim 3, further comprising a stopper.

5. A method for measuring the flow of a flowable material, comprising:
   a. providing flowable material;
   b. providing a flow meter, said flow meter further comprising:
      i. a housing further comprising an inlet for receiving material and an outlet for exiting material;
      ii. sensing unit within the housing and further comprising:
         A. a rounded cap; and
         B. a load cell;
      iii. an adjustment mechanism;
      iv. a vertical gap defined between the inlet and rounded cap and comprising an overall distance;
         wherein the adjustment mechanism is configured to adjust the overall distance of the vertical gap defined between the rounded cap and the inlet to adjust the flow rate and allow for creation of layers of materials over the rounded cap such that only a portion of the flowable material directly contacts the rounded cap without restricting material flow;
   c. providing a processor; and
   d. establishing the weight of material flow through the flow meter by measuring pressure applied by the material to the rounded cap by way of the load cell, said load cell being in electronic communication with the processor so as to measure the flow.

6. The method as provided in claim 5, wherein the flow meter further comprises a movable top plate and a stationary bottom plate, such that the top plate moves relative to the bottom plate, thereby applying pressure to the load cell.

7. The method as provided in claim 5, wherein the flow meter further comprises a spacer.

8. The method as provided in claim 5, wherein the flow meter further comprises a stopper.

9. The apparatus of claim 1, wherein pressure is translated into a readable signal by way of the load cell for transmittal to the processor.

10. The apparatus of claim 1, further comprising a flow readout.

11. The apparatus of claim 1, wherein the adjustment mechanism is operated by the processor, so as to adjust flow rate and material handling.

* * * * *